US012628188B2

(12) United States Patent
Miao et al.

(10) Patent No.: US 12,628,188 B2
(45) Date of Patent: May 12, 2026

(54) METHOD, DEVICE AND COMPUTER READABLE MEDIUM FOR COMMUNICATIONS

(71) Applicant: NEC CORPORATION, Tokyo (JP)

(72) Inventors: Zhaobang Miao, Beijing (CN); Gang Wang, Beijing (CN)

(73) Assignee: NEC Corporation, Tokyo (JP)

( * ) Notice: Subject to any disclaimer, the term of this patent is extended or adjusted under 35 U.S.C. 154(b) by 321 days.

(21) Appl. No.: 17/912,350

(22) PCT Filed: Mar. 19, 2020

(86) PCT No.: PCT/CN2020/080284
§ 371 (c)(1),
(2) Date: Sep. 16, 2022

(87) PCT Pub. No.: WO2021/184321
PCT Pub. Date: Sep. 23, 2021

(65) Prior Publication Data
US 2023/0131353 A1      Apr. 27, 2023

(51) Int. Cl.
*H04W 72/40*          (2023.01)
*H04W 72/02*          (2009.01)

(52) U.S. Cl.
CPC ........... *H04W 72/40* (2023.01); *H04W 72/02* (2013.01)

(58) Field of Classification Search
CPC ............................... H04W 72/40; H04W 72/02
See application file for complete search history.

(56) References Cited

U.S. PATENT DOCUMENTS

2023/0109558 A1*   4/2023   Hui ....................... H04L 5/0094
                                                       370/329

FOREIGN PATENT DOCUMENTS

| CN | 108028730 A | 5/2018 | |
| CN | 110149708 A | 8/2019 | |
| EP | 3 352 402 A1 | 7/2018 | |
| KR | 20210077670 A * | 6/2021 | .......... H04W 72/542 |
| WO | 2019/091098 A1 | 5/2019 | |
| WO | 2019/187562 A1 | 10/2019 | |

OTHER PUBLICATIONS

"Summary of Mode 4 CA", LG Electronics, 3GPP TSG RAN WG1 Meeting #92bis, R1-1805393, Apr. 16-20, 2018, 8 pages.
(Continued)

*Primary Examiner* — Samina F Choudhry
(74) *Attorney, Agent, or Firm* — Sughrue Mion, PLLC

(57)          ABSTRACT
Embodiments of the present disclosure relate to a method, device and computer readable media for communications. A method comprises receiving, at a first terminal device from a second terminal device, information about a first set of candidate resources for the first terminal device to perform a sidelink transmission. The method further comprises determining a second set of candidate resources for performing the sidelink transmission. The method further comprises determining a first subset of the second set by identifying an overlap between the first set and the second set based at least on the information. The method further comprises selecting target resources for the sidelink transmission based at least on the first subset.

8 Claims, 4 Drawing Sheets

100

(56) References Cited

OTHER PUBLICATIONS

International Search Report of PCT/CN2020/080284 dated Dec. 21, 2020 [PCT/ISA/210].

Written Opinion of PCT/CN2020/080284 dated Dec. 21, 2020 [PCT/ISA/237].

LG Electronics, "Discussion on resource allocation for Mode 2", 3GPP TSG RAN WG1 #99, Reno US, Nov. 18-22, 2019, R1-1912588 (17 pages).

ZTE, Sanechips, "Mode 2 resource allocation schemes on sidelink", 3GPP TSG RAN WG1 #98, Prague, CZ, Aug. 26-30, 2019, R-1908795 (12 pages).

ASTRI, TCL Communication Ltd., " Resource selection for V2X systems supporting CA", 3GPP TSG RAN WG1 Meeting 90bis, Prague, CZ, Oct. 9-13, 2017, R1-1717415 (6 pages).

Japanese Office Action dated Dec. 26, 2023 in Application No. 2022-556220.

Extended European Search Report dated Dec. 4, 2023 in Application No. 20925587.6.

* cited by examiner

100

110

120-2

120-1

200

110

120

FIRST TERMINAL
DEVICE

SECOND TERMINAL
DEVICE

210

220

230

240

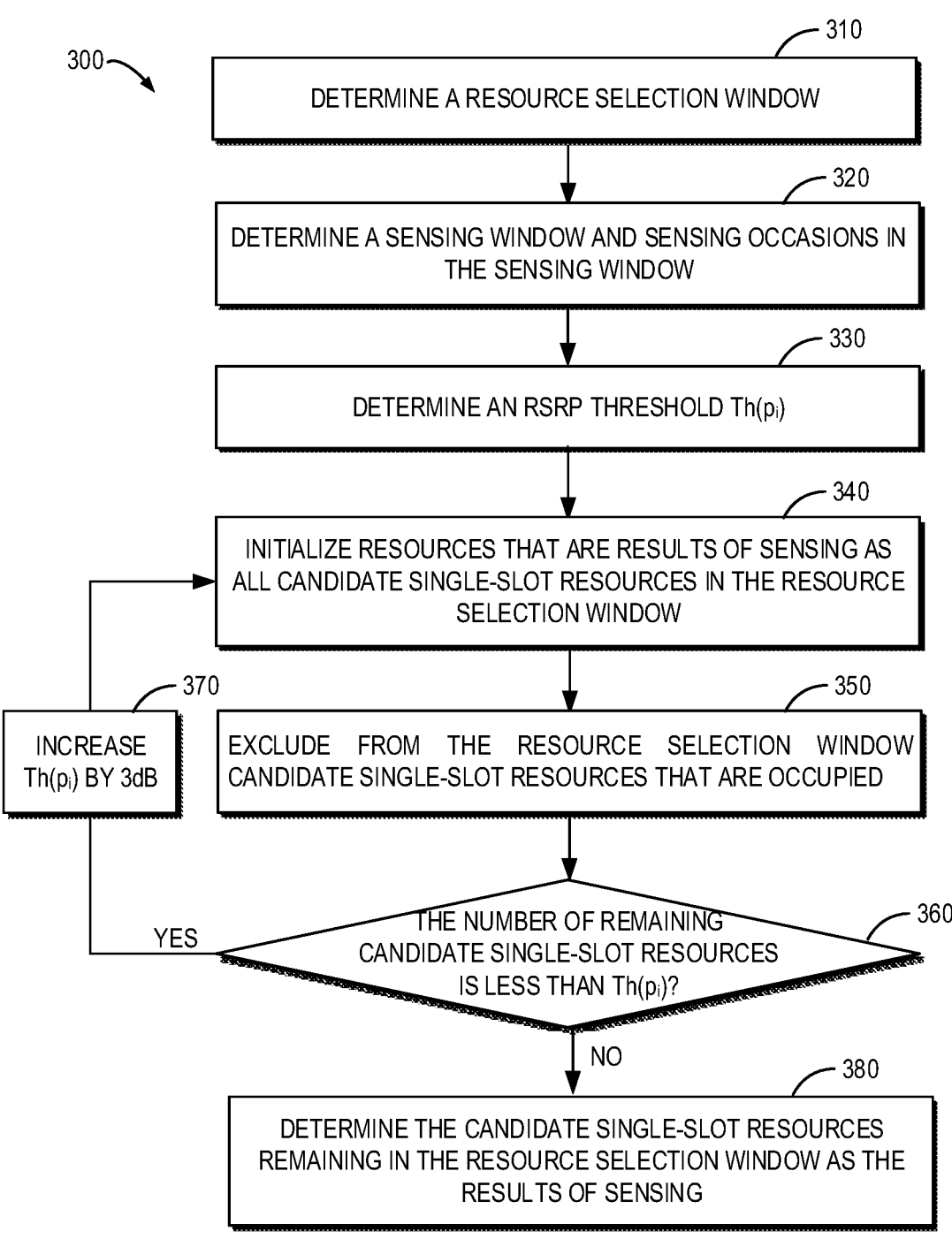

300

310
DETERMINE A RESOURCE SELECTION WINDOW

320
DETERMINE A SENSING WINDOW AND SENSING OCCASIONS IN THE SENSING WINDOW

330
DETERMINE AN RSRP THRESHOLD $Th(p_i)$

340
INITIALIZE RESOURCES THAT ARE RESULTS OF SENSING AS ALL CANDIDATE SINGLE-SLOT RESOURCES IN THE RESOURCE SELECTION WINDOW

370
INCREASE $Th(p_i)$ BY 3dB

350
EXCLUDE FROM THE RESOURCE SELECTION WINDOW CANDIDATE SINGLE-SLOT RESOURCES THAT ARE OCCUPIED

360
THE NUMBER OF REMAINING CANDIDATE SINGLE-SLOT RESOURCES IS LESS THAN $Th(p_i)$?

YES

NO

380
DETERMINE THE CANDIDATE SINGLE-SLOT RESOURCES REMAINING IN THE RESOURCE SELECTION WINDOW AS THE RESULTS OF SENSING

Fig. 3

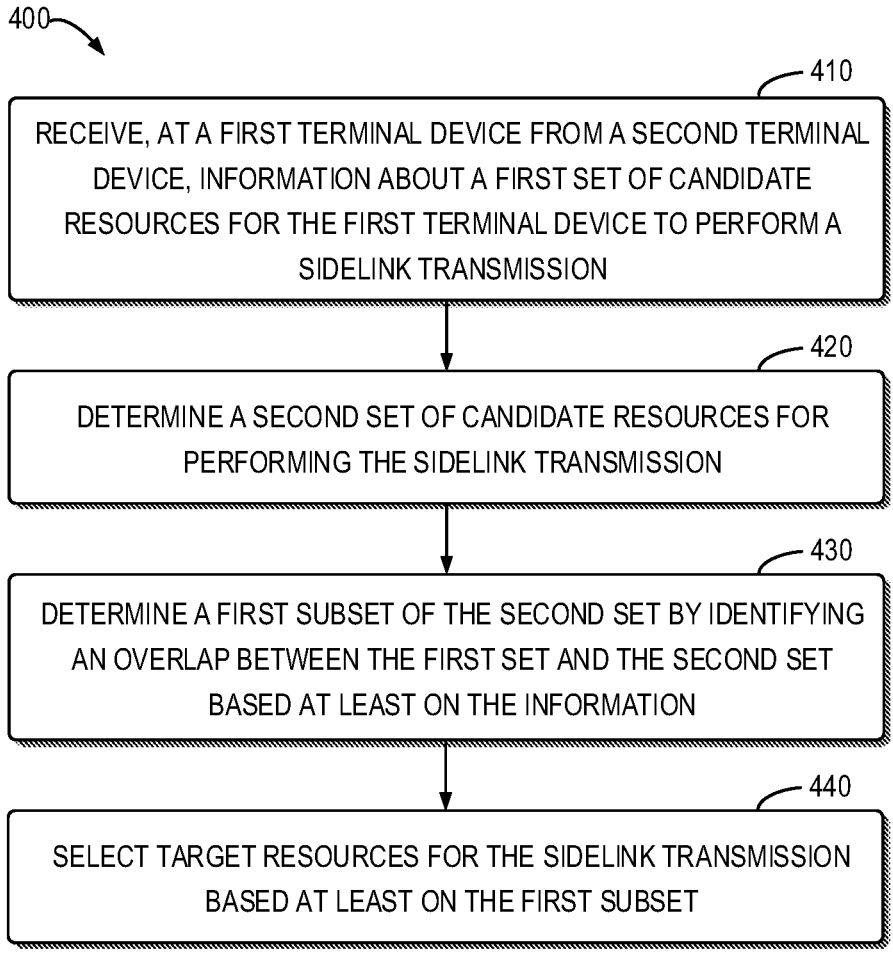

400

410

RECEIVE, AT A FIRST TERMINAL DEVICE FROM A SECOND TERMINAL DEVICE, INFORMATION ABOUT A FIRST SET OF CANDIDATE RESOURCES FOR THE FIRST TERMINAL DEVICE TO PERFORM A SIDELINK TRANSMISSION

420

DETERMINE A SECOND SET OF CANDIDATE RESOURCES FOR PERFORMING THE SIDELINK TRANSMISSION

430

DETERMINE A FIRST SUBSET OF THE SECOND SET BY IDENTIFYING AN OVERLAP BETWEEN THE FIRST SET AND THE SECOND SET BASED AT LEAST ON THE INFORMATION

440

SELECT TARGET RESOURCES FOR THE SIDELINK TRANSMISSION BASED AT LEAST ON THE FIRST SUBSET

Fig. 4

METHOD, DEVICE AND COMPUTER READABLE MEDIUM FOR COMMUNICATIONS

TECHNICAL FIELD

Embodiments of the present disclosure generally relate to the field of telecommunication, and in particular, to a method, device and computer readable medium for communications.

BACKGROUND

Certain communication systems enable vehicle to everything (V2X) and device to device (D2D) communications to be performed. V2X communications can be based on communication technologies such as sidelink communication technologies. For this, sidelink resource pools and sidelink channels can be established for vehicles participating in such communications.

In V2X communications, there are two modes of resource allocation. In a first mode (also referred to as NR V2X mode 1 or mode 1 hereinafter), one terminal device may perform V2X communications with the other terminal device by using resources allocated by a network device. In a second mode (also referred to as NR V2X mode 2 or mode 2 hereinafter), one terminal device may perform V2X communications with the other terminal device by using resources autonomously selected in a resource pool by the one terminal device. In order to enhance reliability and reduce latency, feasibility and benefit of the enhancements in the mode 2 need to be studied.

SUMMARY

In general, example embodiments of the present disclosure provide a method, device and computer readable medium for communications.

In a first aspect, there is provided a method for communications. The method comprises receiving, at a first terminal device from a second terminal device, information about a first set of candidate resources for the first terminal device to perform a sidelink transmission. The method further comprises determining a second set of candidate resources for performing the sidelink transmission. The method further comprises determining a first subset of the second set by identifying an overlap between the first set and the second set based at least on the information. The method further comprises selecting target resources for the sidelink transmission based at least on the first subset.

In a second aspect, there is provided a terminal device. The terminal device comprises a processor and a memory storing instructions. The memory and the instructions are configured, with the processor, to cause the terminal device to perform the method according to the first aspect.

In a third aspect, there is provided a computer readable medium having instructions stored thereon. The instructions, when executed on at least one processor of a device, cause the device to perform the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 3 illustrates a flowchart of an example method for determining the resources that are results of sensing in accordance with some embodiments of the present disclosure;

FIG. 4 illustrates a flowchart of an example method in accordance with some embodiments of the present disclosure.

Throughout the drawings, the same or similar reference numerals represent the same or similar element.

DETAILED DESCRIPTION

Figure 1:
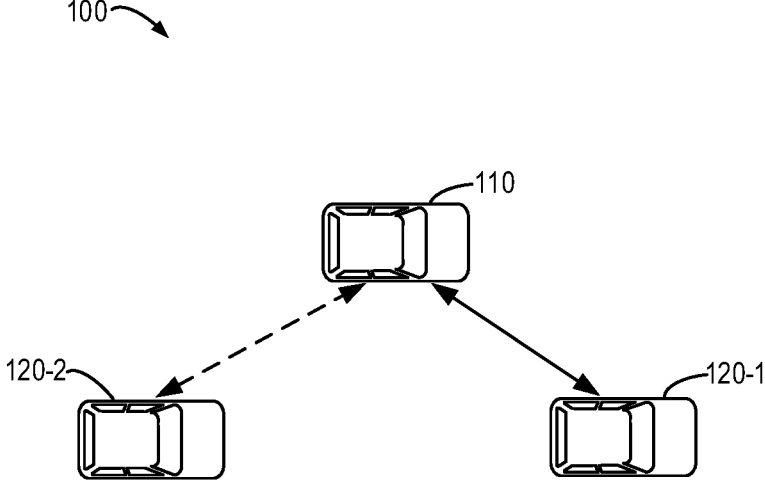
FIG. 1 illustrates an example communication network in which implementations of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, in V2X communications, in the mode 2 of resource allocation, one terminal device may perform V2X communications with the other terminal device by using resources autonomously selected in a resource pool by the one terminal device. In order to enhance reliability and reduce latency, feasibility and benefit of the enhancements in the mode 2 need to be studied.

Embodiments of the present disclosure provide a solution for resource allocation in V2X communications, so as to solve the above problems and one or more of other potential problems. According to the solution, a first terminal device receives from a second terminal device information about a first set of candidate resources for the first terminal device to perform a sidelink transmission. The first terminal device determines a second set of candidate resources for the sidelink transmission. The first terminal device determines at least a first subset of the second set based at least on the information. In turn, the first terminal device prioritizes candidate resources in the first subset to be selected as target resources for the sidelink transmission. In this way, coordination for resource allocation between the first terminal device and the second terminal device is enabled.

FIG. 1 illustrates a schematic diagram of an example communication network 100 in which embodiments of the present disclosure can be implemented. As shown in FIG. 1, the communication network 100 may include a terminal device 110 (also referred to as "first terminal device 110"), and terminal devices 120-1 and 120-2 (collectively referred to as "second terminal devices 120" or individually referred to as "second terminal device 120"). It should be understood that the communication network 100 may further include a network device (not shown). The network device may communicate with the first terminal device 110 and the second terminal devices 120 via respective wireless communication channels. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

In FIG. 1, the first terminal device 110 and the second terminal devices 120 are shown as vehicles which enable V2X communications. It is to be understood that embodiments of the present disclosure are also applicable to other terminal devices than vehicles, such as mobile phones, sensors and so on.

In some embodiments, the first terminal device 110 may have established a sidelink with the terminal device 120-1. In other words, the first terminal device 110 may have established an on-going communication session with the terminal device 120-1. In this regard, the terminal device 120-1 may be referred to as an in-session terminal device.

In other embodiments, the first terminal device 110 may not have established a sidelink with the terminal device 120-2. In other words, the first terminal device 110 may not have established an on-going communication session with the terminal device 120-1. In this regard, the terminal device 120-1 may be referred to as an out-of-session terminal device.

In some embodiments, if sensing is enabled, any of the first terminal device 110 and the second terminal devices 120 may select resources for a sidelink transmission based on their respective results of sensing sidelink channels. On the other hand, if sensing is disabled, any of the first terminal device 110 and the second terminal devices 120 may randomly select resources from a sidelink resource pool for a sidelink transmission.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
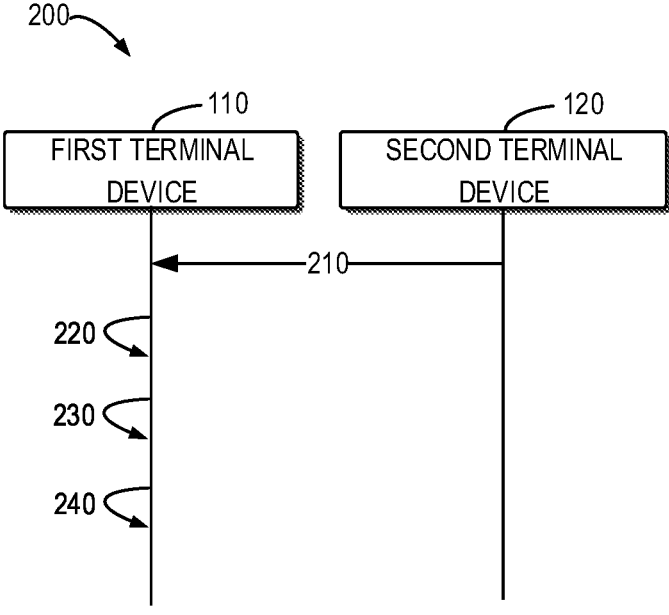
FIG. 2 illustrates an example signaling chart showing an example process for resource allocation in accordance with some embodiments of the present disclosure.

FIG. 2 illustrates an example signaling chart showing an example process 200 for resource allocation in accordance with some embodiments of the present disclosure. As shown in FIG. 2, the process 200 may involve the first terminal device 110 and the second terminal devices 120 as shown in FIG. 1. It is to be understood that the process 200 may include additional acts not shown and/or may omit some acts as shown, and the scope of the present disclosure is not limited in this regard. In addition, it will be appreciated that, although primarily presented herein as being performed serially, at least a portion of the acts of the process 200 may be performed contemporaneously or in a different order than as presented in FIG. 2.

As shown in FIG. 2, the first terminal device 110 receives 210 from the second terminal device 120 information about a first set of candidate resources for the first terminal device 110 to perform a sidelink transmission.

In some embodiments, the first set comprises resources that will not be used for transmission by the second terminal device 120. In some embodiments, such resources may be resources that are suggested to be selected by the first terminal device 110 for the sidelink transmission.

In other embodiments, the first set comprises resources that will be used for transmission by the second terminal device 120. In some embodiments, such resources may be resources that are not suggested to be selected by the first terminal device 110 for the sidelink transmission.

In still other embodiments, if sensing is enabled, the second terminal device 120 may sense sidelink channels and determine resources that are results of sensing. In such embodiments, the second terminal device 120 may determine the resources that are results of sensing as the candidate resources in the first set.

The first terminal device 110 determines 220 a second set of candidate resources for performing the sidelink transmission. It should be understood that the act 220 is shown in FIG. 2 as being performed after the act 210 by way of example and it should not be regarded as suggesting a limitation on the scope of the present disclosure. In other embodiments, the act 220 may be performed before the act 210. Alternatively, the act 220 and the act 210 may be performed serially.

In some embodiments, the second set comprises resources in a resource selection window for the first terminal device 110.

In other embodiments, if sensing is disabled, the first terminal device 110 may determine resources in a sidelink resource pool as the candidate resources in the second set.

In still other embodiments, similar to the second terminal device 120, if the sensing is enabled, the first terminal device 110 may sense sidelink channels and determine resources that are results of sensing. In such embodiments, the first terminal device 110 may determine the resources that are results of sensing as the candidate resources in the second set.

FIG. 3 illustrates a flowchart of a method 300 for determining the resources that are results of sensing in accordance with embodiments of the present disclosure. The method 300 can be implemented by any of the first terminal device 110 and the second terminal device 120 as shown in FIG. 1. Hereinafter, the method 300 will be described as being implemented by the first terminal device 110 by way of example.

At block 310, the first terminal device 110 determines a resource selection window. The resource selection window may include a plurality of candidate single-slot resources. The total number of the candidate single-slot resources may be represented by $M_{total}$.

At block 320, the first terminal device 110 determines a sensing window and sensing occasions in the sensing window. A sensing occasion refers to a slot in which a terminal device decodes Sidelink Control Information (SCI) from other terminal devices and measures Reference Signal Received Power (RSRP).

In some embodiments, the first terminal device 110 performs a sensing in the sensing window. In other embodiments, the first terminal device 110 performs a partial sensing in the sensing window.

At block 330, the first terminal device 110 determines an RSRP threshold $Th(p_i)$. In some embodiments, the first terminal device 110 may determine the RSRP threshold $Th(p_i)$ based on a first priority indicated in SCI from other terminal devices and a second priority of data to be transmitted by the first terminal device 110.

At block 340, the first terminal device 110 initializes resources that are results of sensing as all the candidate single-slot resources in the resource selection window.

At block 350, through sensing the sidelink channels in the sensing window, the first terminal device 110 excludes from the resource selection window one or more candidate single-slot resources that are identified as occupied by other terminal devices. For example, the other terminal devices may comprise the second terminal device 120 and/or one or more terminal devices not shown in FIG. 1. For example, the first terminal device 110 may perform RSRP measurement in the sensing occasions in the sensing window. If the RSRP measurement in a slot is higher than the RSRP threshold $Th(p_i)$, the first terminal device 110 excludes the associated candidate single-slot resource from the resource selection window.

At block 360, the first terminal device 110 determines whether the number of candidate single-slot resources remaining in the resource selection window is less than $0.2 \cdot M_{total}$.

If the number of candidate single-slot resources remaining in the resource selection window is less than $0.2 \cdot M_{total}$, the RSRP threshold $Th(p_i)$ is increased by 3 dB at block 370 and the procedure continues with the block 340. On the other hand, if the number of candidate single-slot resources remaining in the resource selection window is greater than or equal to $0.2 \cdot M_{total}$, at block 380, the first terminal device 110 determines the candidate single-slot resources remaining in the resource selection window as the results of sensing.

It will be appreciated that the method 300 is just an example of determining the resources that are results of sensing. The resources that are results of sensing may be determined based on any suitable procedure, and/or any procedure either currently known or to be developed in the future. It should not be seen as limiting the scope of the present disclosure to only the aforementioned method 300.

Returning to FIG. 2, the first terminal device 110 identifies 230 an overlap between the first set and the second set based at least on the received information so as to determine a first subset of the second set.

The first terminal device 110 selects 240 target resources for the sidelink transmission based at least on the first subset.

As mentioned above, in some embodiments, the first set may comprise resources that will not be used for transmission by the second terminal device 120 and the second set may comprise one of the following: resources that are results of sensing sidelink channels by the first terminal device 110, or resources in the sidelink resource pool. In such embodiments, the first subset comprises the overlap between the first set and the second set. In some embodiments, the overlap comprises an overlap in time domain. Because the first terminal device 110 may select the target resources in the first subset comprising the overlap in time domain, the first terminal device 110 could mitigate half-duplex issue and consecutive packet loss.

In embodiments where the first set comprises resources that will be used for transmission by the second terminal device 120, and the second set comprises resources in the resource selection window for the first terminal device 110, the first terminal device 110 may determine the first subset by performing the following.

Generally speaking, the first terminal device 110 may handle the first set before sensing. The first terminal device 110 may exclude the first set of candidate resources from the resource selection window. Consider the example method 300 as described with reference to FIG. 3. For example, at block 310, the first terminal device 110 may determine the resource selection window that does not include the first set of candidate resources. Alternatively, at block 340, the first terminal device 110 may initialize resources that are results of sensing as the candidate single-slot resources in the resource selection window excluding the first set. Alternatively, at block 350, the first terminal device 110 may exclude the first set of candidate resources from the resource selection window.

In addition, in order to handle the first set before sensing, the first terminal device 110 may exclude sensing occasions associated with the first set from a sensing window for the first terminal device 110. For example, in the method 300, at block 320, the first terminal device 110 may exclude the sensing occasions associated with the first set from the sensing window.

In some embodiments, the sensing occasions in the sensing window may be associated with the candidate resources in the resource selection window based on an allowed reservation period. In some embodiments, the allowed reservation period may be any of predefined possible reservation interval values. In other embodiments, the allowed reservation period may be an RRC parameter "reservation-PeriodAllowed" in NR sidelink. As such, the first terminal device 110 may exclude the sensing occasions associated with the first set from the sensing window based on the allowed reservation period.

Then, the first terminal device 110 may sense the sidelink channels in the sensing window, and exclude from the resource selection window one or more candidate single-slot resources that are occupied by other terminal devices. For example, the first terminal device 110 may exclude the occupied candidate single-slot resources from the resource selection window by performing the act at block 350 in FIG. 3.

In turn, the first terminal device 110 may determine resources in the resource selection window excluding the resources that are occupied as the first subset. For example, in the method 300, at block 380, the first terminal device 110 may determine the candidate single-slot resources remaining in the resource selection window as the first subset. In other words, the first terminal device 110 may determine the sensing results as the first subset.

Because the first terminal device 110 handles the first set before sensing, the number of sensing occasions is reduced. Thus, the complexity of sensing is reduced.

As an alternative to the solution of handling the first set before sensing, the first terminal device 110 may handle the first set after sensing. In such embodiments, the first set may comprise resources that will be used for transmission by the second terminal device 120, and the second set may comprise resources that are results of sensing sidelink channels by the first terminal device 110, or resources in the sidelink resource pool. In such embodiments, upon determining the second set comprising the resources that are results of sensing or the resources in the sidelink resource pool, the first terminal device 110 may exclude the overlap from the second set. In turn, the first terminal device 110 may determine the remaining candidate resources in the second set as the first subset.

In some embodiments, the overlap comprises an overlap in time domain. Because the first terminal device 110 may select the target resources in the first subset excluding the overlap in time domain, the first terminal device 110 could mitigate half-duplex issue and consecutive packet loss.

In embodiments where the first set comprises resources that are results of sensing sidelink channels by the second terminal device 120, and the second set comprises one of the following: the resources that are results of sensing the sidelink channels by the first terminal device, or the resources in the sidelink resource pool, the first subset may comprise the overlap between the first set and the second set.

In some embodiments the overlap comprises an overlap both in time domain and in frequency domain. Because the first terminal device 110 may select the target resources in the first subset including the overlap in time domain and in frequency domain, the first terminal device 110 could mitigate half-duplex issue and consecutive packet loss.

In embodiments where the second set comprises the resources in the sidelink resource pool, upon determining the first subset of the second set, the first terminal device 110 may, for example, randomly select the candidate resources in the first subset for the sidelink transmission.

In some embodiments, the determination of the first subset may be performed at a physical layer of the first terminal device 110, and the selection of the target resources for the sidelink transmission may be performed at a higher layer of the first terminal device 110. For the purpose of the selection, the first terminal device 110 may transmit a report about the first subset from the physical layer to the higher layer.

In some embodiments, the first terminal device 110 may determine whether a ratio of the number of candidate single-slot resources in the first subset to a total number of candidate single-slot resources in a resource selection window for the first terminal device 110 is above or equals a threshold ratio. If the ratio is above or equals the threshold ratio, the first terminal device 110 may transmit the report about the first subset from the physical layer to the higher layer.

In some embodiments, the threshold ratio is configurable. For example, the threshold ratio is configurable by a higher layer of the first terminal device 110.

In some embodiments, the threshold ratio may be in the range of 0.1 to 0.5.

In some embodiments, the first terminal device 110 may further determine a second subset of the second set. The second subset comprises the candidate resources in the second set excluding the first subset. In such embodiments, the first terminal device 110 may transmit a report about the first subset and the second subset from the physical layer to the higher layer.

In some embodiments, the first terminal device 110 may determine whether a ratio of the number of candidate single-slot resources in the first subset to a total number of candidate single-slot resources in a resource selection window for the first terminal device 110 is above a configured threshold. If the ratio is below the configured threshold, the first terminal device 110 transmits the report about the first subset and the second subset from the physical layer to the higher layer.

In some embodiments, the first terminal device 110 may transmit a first report about the first subset at a first time point, and transmit a second report about the second subset at a second time point subsequent to the first time point.

Alternatively, the first terminal device 110 may transmit the first report about the first subset in a first predefined field in a signaling, and transmit the second report about the second subset in a second predefined field in the signaling. The second predefined field is different from the first predefined field.

In some embodiments, the first terminal device 110 may prioritize the candidate resources in the first subset to be selected as the target resources. For example, the first terminal device 110 may select the candidate resources in the first subset with a higher probability.

In some embodiments, in order to prioritizing the candidate resources in the first subset to be selected as the target resources, the first terminal device 110 may determine whether the number of the candidate resources in the first subset is above a threshold number. If the number of the candidate single-slot resources in the first subset is above or equals the threshold number, the first terminal device 110 may select the candidate resources in the first subset.

On the other hand, if the number of the candidate resources in the first subset is below the threshold number, the first terminal device 110 may select the candidate resources in the first subset and the candidate resources in the second subset. In this way, more flexibility for the selection of candidate resources may be achieved.

FIG. 4 illustrates a flowchart of an example method 400 in accordance with some embodiments of the present disclosure. For example, the method 400 can be performed at the first terminal device 110 as shown in FIGS. 1-2. It is to be understood that the method 400 may include additional blocks not shown and/or may omit some blocks as shown, and the scope of the present disclosure is not limited in this regard.

At block 410, the first terminal device 110 receives, from the second terminal device 120, information about a first set of candidate resources for the first terminal device 110 to perform a sidelink transmission.

At block 420, the first terminal device 110 determines a second set of candidate resources for performing the sidelink transmission.

At block 430, the first terminal device 110 determines a first subset of the second set by identifying an overlap between the first set and the second set based at least on the information.

At block 440, the first terminal device 110 selects target resources for the sidelink transmission based at least on the first subset.

In some embodiments, the first set comprises resources that will not be used for transmission by the second terminal device; the second set comprises one of the following: resources that are results of sensing sidelink channels by the first terminal device, or resources in a sidelink resource pool; and the first subset comprises the overlap between the first set and the second set.

In some embodiments, the overlap comprises an overlap in time domain.

In some embodiments, the first set comprises resources that will be used for transmission by the second terminal device; the second set comprises resources in a resource selection window for the first terminal device; and determining the first subset comprises: excluding the first set of candidate resources from the resource selection window; excluding sensing occasions associated with the first set from a sensing window for the first terminal device; determining resources that are occupied at least by a third terminal device in the resource selection window by sensing sidelink channels in the sensing window; and determining resources in the resource selection window excluding the resources that are occupied as the first subset.

In some embodiments, the first set comprises resources that will be used for transmission by the second terminal device; the second set comprises one of the following: resources that are results of sensing sidelink channels by the first terminal device, or resources in a sidelink resource pool; and the first subset comprises the candidate resources in the second set excluding the overlap.

In some embodiments, the overlap comprises an overlap in time domain.

In some embodiments, the first set comprises resources that are results of sensing sidelink channels by the second terminal device; the second set comprises one of the following: resources that are results of sensing the sidelink channels by the first terminal device, or resources in a sidelink resource pool; and the first subset comprises the overlap between the first set and the second set.

In some embodiments, the overlap comprises an overlap both in time domain and in frequency domain.

In some embodiments, the method 400 further comprises: transmitting a report about the first subset from a physical layer of the first terminal device to a higher layer of the first terminal device.

In some embodiments, the method 400 further comprises: determining whether a ratio of the number of candidate single-slot resources in the first subset to a total number of candidate single-slot resources in a resource selection window for the first terminal device is above or equals a threshold ratio; and transmitting a report about the first subset comprises: in accordance with a determination that the ratio is above or equals the threshold ratio, transmitting the report about the first subset.

In some embodiments, the method 400 further comprises: determining a second subset of the second set, the second subset comprising the candidate resources in the second set excluding the first subset; and transmitting a report about the first subset and the second subset from a physical layer of the first terminal device to a higher layer of the first terminal device.

In some embodiments, the method 400 further comprises: determining whether a ratio of the number of candidate single-slot resources in the first subset to a total number of candidate single-slot resources in a resource selection window for the first terminal device is above a configured threshold; and transmitting the report about the first subset and the second subset comprises: in accordance with a determination that the ratio is below the configured threshold, transmitting the report about the first subset and the second subset.

In some embodiments, transmitting the report about the first subset and the second subset comprises: transmitting a first report about the first subset at a first time point; and transmitting a second report about the second subset at a second time point subsequent to the first time point.

In some embodiments, transmitting the report about the first subset and the second subset comprises: transmitting a third report about the first subset in a first predefined field in a signaling; and transmitting a fourth report about the second subset in a second predefined field in the signaling, the second predefined field different from the first predefined field.

In some embodiments, selecting target resources for the sidelink transmission based at least on the first subset comprises: prioritizing the candidate resources in the first subset to be selected as the target resources. For example, prioritizing the candidate resources in the first subset to be selected as the target resources comprises selecting the candidate resources in the first subset as the target resources with a higher probability.

In some embodiments, prioritizing the candidate resources in the first subset to be selected as the target resources comprises: determining whether the number of the candidate resources in the first subset is above a threshold number; in accordance with a determination that the number of the candidate single-slot resources in the first subset is above or equals the threshold number, selecting the candidate resources in the first subset; and in accordance with a determination that the number of the candidate resources in the first subset is below the threshold number, selecting the candidate resources in the first subset and the second subset.

It shall be appreciated that descriptions of features with reference to FIGS. 1 to 3 also apply to the method 400, and have the same effects. Thus, the details of the features are omitted.

Figure 5:
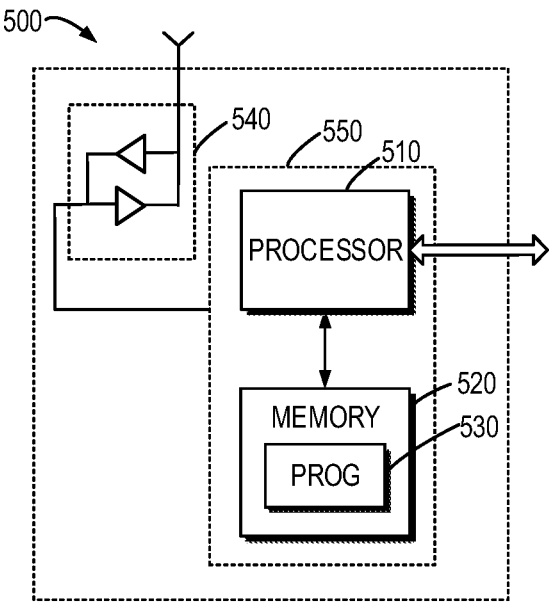
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example implementation of the terminal device 110 or 120 as shown in FIG. 1. Accordingly, the device 500 can be implemented at or as at least a part of the terminal device 110 or 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 510 stores at least a part of a program 530.

The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the embodiments of the present disclosure, as discussed herein with reference to FIGS. 1 to 4. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote readable media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a first terminal device, comprising:

receiving, from a second terminal device, a set of preferred resources for the first terminal device to perform a sidelink transmission;

selecting time and frequency resources for the sidelink transmission within an overlap between the set of preferred resources and a sensing result of the first terminal device; and performing the sidelink transmission, to the second terminal device, using the selected time and frequency resources.

2. The method of claim 1, wherein:

the set of preferred resources comprises resources that will not be used for transmission by the second terminal device.

3. The method of claim 2, wherein the overlap comprises an overlap in time domain.

4. The method of claim 1, wherein:

the set of preferred resources comprises resources that will be used for transmission by the second terminal device.

5. The method of claim 1, wherein:

the set of preferred resources comprises resources that will be used for transmission by the second terminal device.

6. The method of claim 5, wherein the overlap comprises an overlap in time domain.

7. The method of claim 1, wherein:

the set of preferred resources comprises resources that are results of sensing sidelink channels by the second terminal device.

8. The method of claim 7, wherein the overlap comprises an overlap both in time domain and in frequency domain.

* * * * *